Aug. 20, 1940.   W. H. HEISE   2,211,816
FOOD PACKAGE
Filed Jan. 30, 1937   2 Sheets-Sheet 1
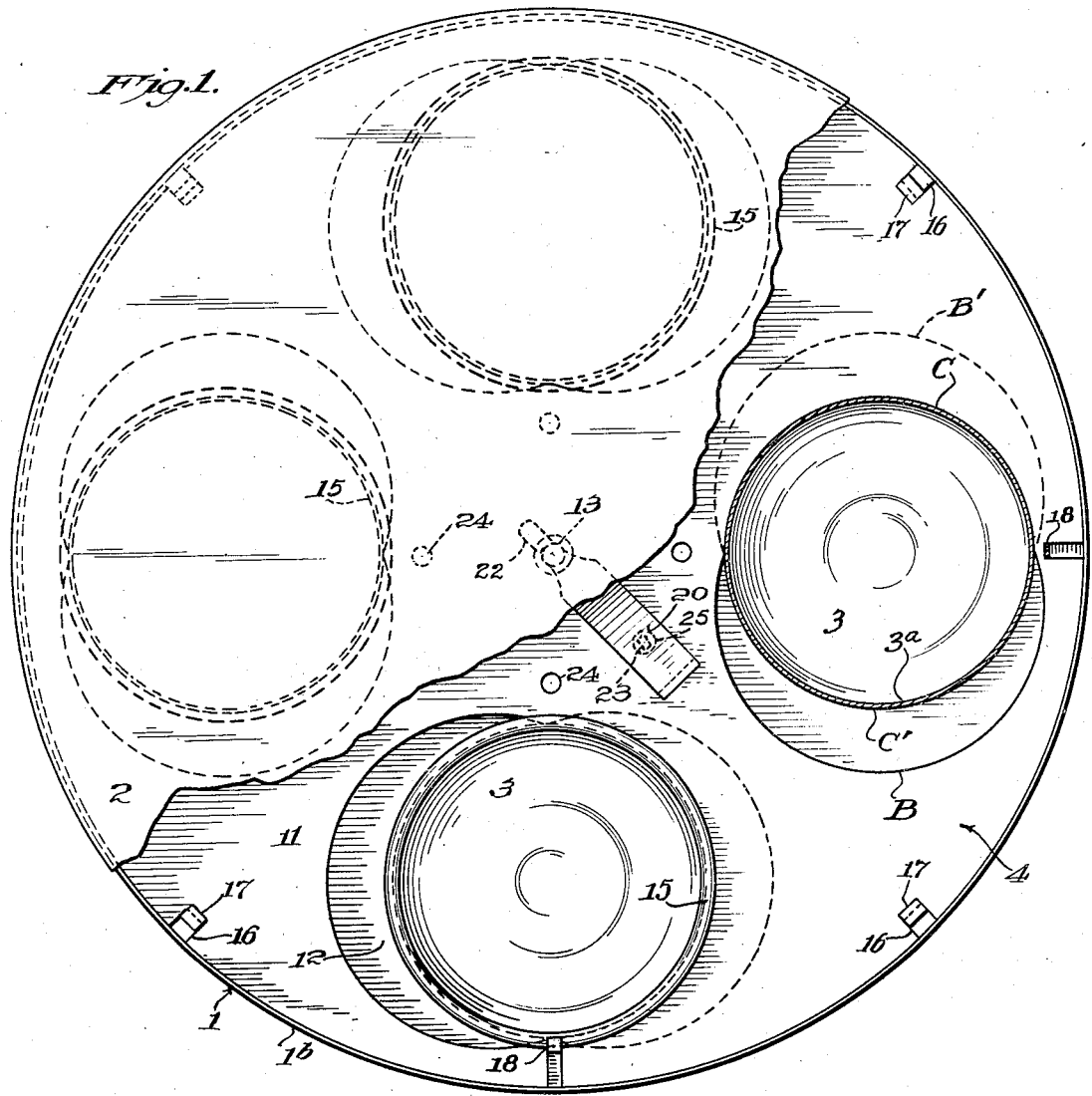
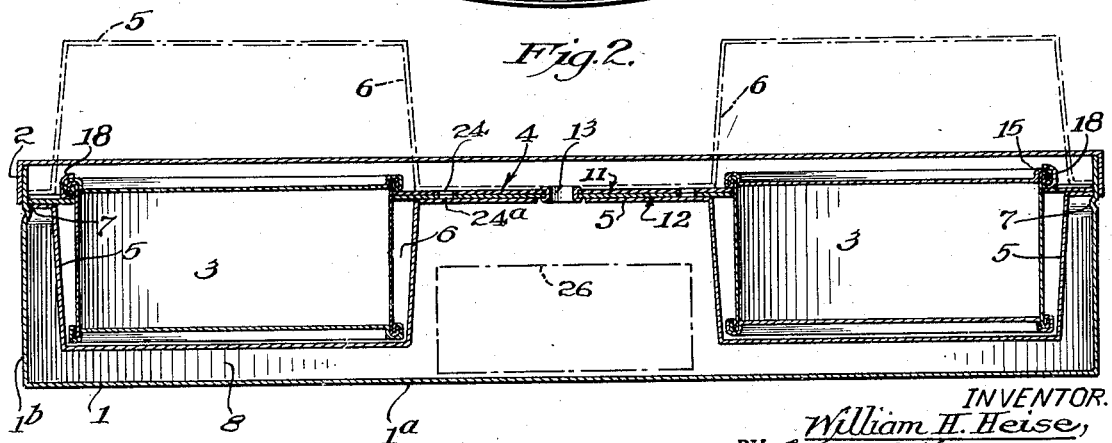
INVENTOR.
William H. Heise,
BY
ATTORNEYS.

Aug. 20, 1940.   W. H. HEISE   2,211,816
FOOD PACKAGE
Filed Jan. 30, 1937   2 Sheets-Sheet 2
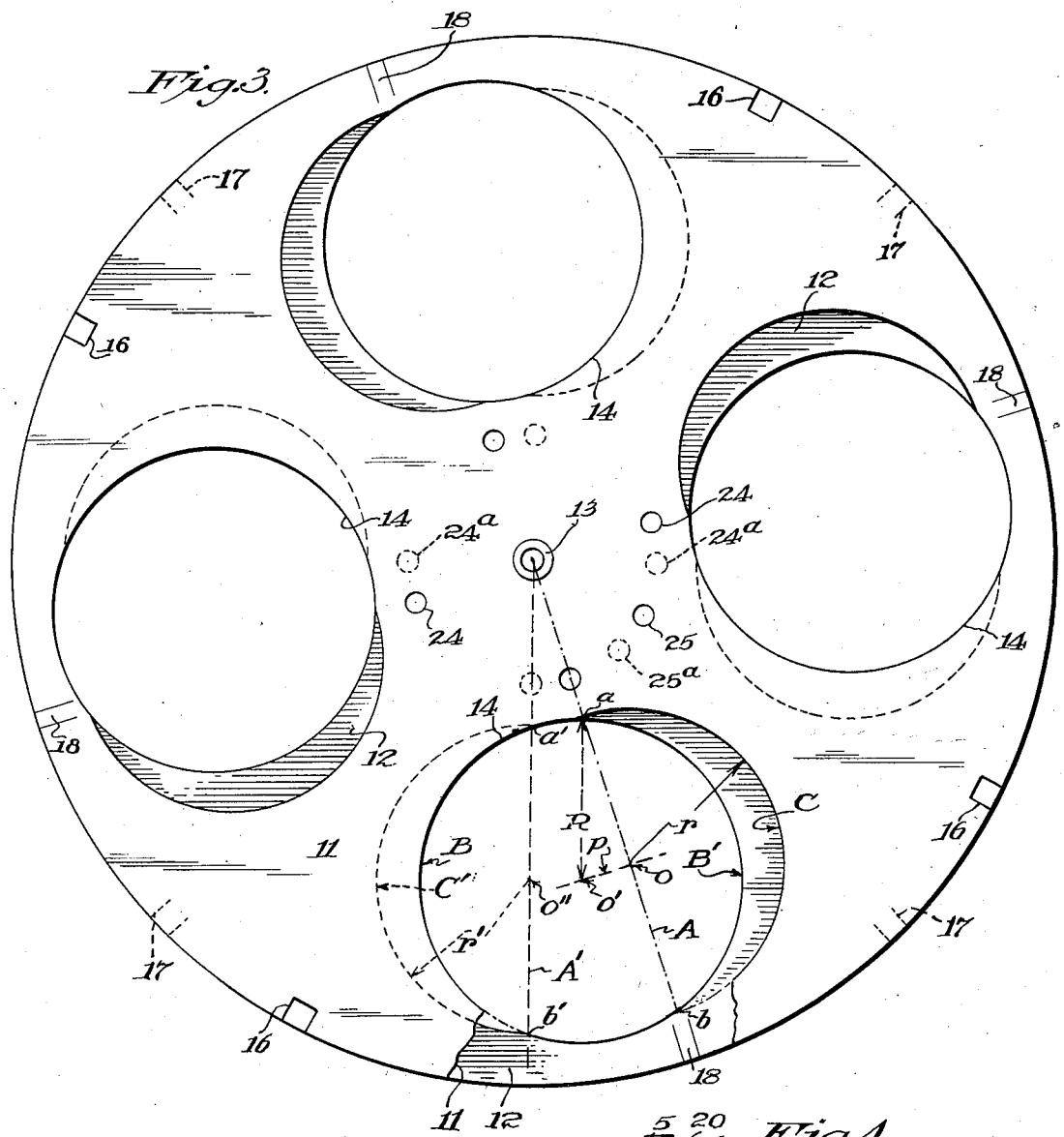
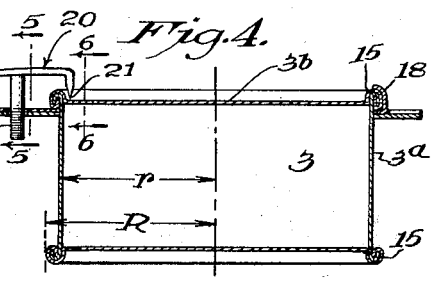
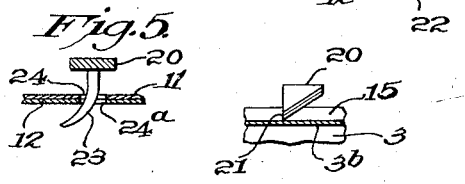
INVENTOR.
William H. Heise,
BY
ATTORNEYS.

Patented Aug. 20, 1940

2,211,816

UNITED STATES PATENT OFFICE 2,211,816

FOOD PACKAGE

William H. Heise, Los Angeles, Calif.

Application January 30, 1937, Serial No. 123,218

16 Claims. (Cl. 99—171)

This invention relates to food packages and pertains more particularly to a package for holding the components of a meal in a plurality of sealed containers.

The principal object of the invention is to provide a food package adapted to separately hold and hermetically preserve the several constituent elements of a complete meal.

A further object of the invention is to provide a food package adapted for the transportation, heating and serving of the separate components of a meal.

Another object of the invention is to provide a food package adapted to hold the components of a meal in a plurality of separate compartments so that the desired components of the meal may be heated, in preparation for serving, while in said package.

Another object of the invention is to provide a food package in which all the components of a meal, along with a can opener and a serving tray, may be packed together as a single compact unit.

A further object of the invention is to provide a food package which is adapted to receive the components of a meal in a plurality of containers, such as standard size tin cans, and which comprises supporting means for positioning said containers within the package, preferably spaced from the bottom of the package, whereby the supporting means and containers may be handled as a unit, said supporting means also advantageously serving to position the containers for opening by an associated can opening device.

The food package of this invention comprises an outer container within which are supported a plurality of hermetically sealed inner containers, each adapted to hold a constituent element of a meal. The outer container is provided with a removable cover which need not be hermetically sealed to the container but which may be normally attached thereto in any suitable manner as by frictional engagement with the side wall in the manner of the ordinary friction lid container.

Other objects and advantages of the invention will either be specifically set forth in the following description or will be apparent therefrom.

I have illustrated a preferred embodiment of my invention in the accompanying drawings and, referring thereto:

Fig. 1 is a plan view of a food package according to my invention, with the removable cover and one of the inner containers partly broken away to show the disposition of elements within said package;

Fig. 2 is a sectional elevation thereof taken on line 2—2 in Fig. 1, with the can opener omitted, showing a serving tray in dot-dash lines in position over the food containers prior to the inverting of the device to empty the contents of the food containers into such serving tray;

Fig. 3 is a plan view, corresponding generally to Fig. 1, showing the container supporting means which are utilized to hold and position the sealed containers in a fixed relation, said supporting means being shown in container-receiving position;

Fig. 4 is a view corresponding generally to the right-hand portion of Fig. 2, showing a can opening device in position to open one of the sealed containers;

Fig. 5 is a detail of the opening device taken on line 5—5 in Fig. 4; and

Fig. 6 is a detail of the opening device taken on line 6—6 in Fig. 4, showing the cutting blade in can-opening position.

Referring to the drawings, the food package may comprise an outer container 1 provided with a friction lid 2. The container 1 may be of any desired shape, but is preferably constructed as a shallow pan of circular cross-section having a flat bottom wall 1a integrally secured to an upstanding side wall 1b. Any desired number of separate food containers 3 are mounted within the container 1, preferably by means of a supporting device 4 removably disposed within the container 1. The package preferably also comprises a removable serving tray member 5 which is preferably disposed within the container 1 in such manner as to fit about the several containers 3 in a compact relation. As shown in the drawings, the package may be provided with four separate sealed containers 3, which are preferably disposed in uniformly spaced relation about the center of the container 1, and the serving tray 5 is provided with an equivalent number of correspondingly disposed recesses 6, each of which is adapted to surround the major portion of one of the respective sealed containers 3 when the package is in assembled relation. An inwardly directed bead 7 may advantageously be provided near the upper edge of the container side wall 1b, providing an inwardly projecting shoulder against which the peripheral portion of the tray 5 may rest, as shown particularly in Fig. 2, and the container supporting means 4 may be allowed to rest on the aforesaid peripheral portion of the tray 5. If desired, the container 1 may be made of sufficient depth with respect to the depth of the recesses 6 so that a space 8 will be provided between the lower ends of said recesses 6 and the bottom wall 1a of the container 1, within which space suitable eating utensils may be packaged and, if desired, a sheet of waxed paper or the like may be provided between the tray and the cans, to keep the tray clean until use.

The container supporting means may be of any desired type which will effectively position the individual sealed containers 3 within the outer container 1 until ready for use, and which will also position the containers during the heating operation hereinafter described. The containers 3 are shown as hermetically sealed containers of the ordinary "tin can" type, each having a cylindrical side wall or body portion 3a defining the smaller external diameter thereof, and upper and lower crimped seals or rim portions 15 defining a larger external diameter. The container supporting means herein shown is so devised as to clamp the containers 3 in position, and may comprise two superimposed circular plate members 11 and 12 pivotally intersecured at their centers as by a loose rivet 13.

The construction of the plates 11 and 12 is more particularly illustrated in Fig. 3, and referring thereto, the upper plate 11 is provided with a plurality of openings 14 equal in number to the number of sealed containers 3 with which the package is provided, and preferably uniformly spaced over the surface of the plate. The openings 14 are preferably of an outline such as would be defined by two overlapping eccentric circles of different diameters, the larger circle being of a diameter equal to or slightly greater than the larger diameter of the sealed container adapted to be clamped by the device, and the smaller circle being of a diameter substantially equal to a smaller diameter of such container.

The openings 14 may be formed as follows: Assuming a radius A to be drawn from the center of the plate 11 toward the periphery thereof, a suitable arc is struck on this radius to define a point o which will define the center of the space occupied by a container 3. A semi-circle of radius r (corresponding to the smaller diameter of a container 3 as indicated in Fig. 4) is then struck to one side of the radius A (for example, to the right as shown), intersecting such radius at a and b. A perpendicular to the radius A at o is then struck, as at p. An arc of radius R (corresponding to the larger diameter of the container 3, as shown in Fig. 4) is then struck with point a or point b as a center, intersecting the perpendicular p at o'. This point, o', becomes the center for the larger eccentric circle (of radius R), which is struck from point a to point b to the opposite side (left) of the radius A. The outline of the opening 14 is thus defined by the circular line B extending from point a to point b to the left of the radius A and the semi-circle C extending from point a to point b to the right of said radius. Said lines B and C are shown in full lines with the exception of certain portions thereof which are shown by dot-dash lines in view of the fact that the edge portion of the plate 11 is broken away at the lower part of Fig. 3.

The upper and lower plates 11 and 12 may be of identical construction as far as the shape and disposition of the openings 14 are concerned, assuming that the center points o of each of these apertures are equally spaced about the center of the plates, and the composite structure is formed by taking two similar plates and inverting one of the plates with respect to the other and intersecuring the same as at 13, so that the enlarged circle portion B which extends to the left of the radius A in the upper plate will extend to the right of a comparable radius A' on the lower plate 12 (as shown at B'), and the semi-circle C which extends to the right of the radius A in the upper plate will extend to the left of the radius A' on the lower plate (as shown at C'). The center o for the semi-circle C on the upper plate thus corresponds to the center o'' on the radius A' on the lower plate, and the points a' and b' correspond to the above-described points a and b.

When it is desired to insert a container 3 within the opening formed by the superimposed and reversed openings 14 in the two plates, the upper and lower plates are rotated with respect to one another until the center o' for the circle portions B and B' in the two plates are superimposed, as shown particularly in Fig. 3. (The radius R may advantageously be made slightly in excess of the larger diameter of the container 3 so that such container may be very readily inserted within the superimposed apertures when the plates 11 and 12 are in the position shown in Fig. 3.)

After the several containers have been inserted so that their upper and lower flange or rim portions 15 are disposed at opposite sides of the plates 11 and 12, and preferably with upper flange 15 resting upon or adjacent the upper plate 11, as shown in Fig. 4, the plates 11 and 12 are rotated in reverse directions to superimpose the radii A and A', which will cause the centers o and o'' to be superimposed, thus producing a circular opening of radius r defined by the two semi-circular portions C and C' which will engage and clamp the body portions 3a of the containers 3, as shown in Figs. 1, 2, and 4. If desired, the respective plates 11 and 12 may be provided with notches 16 and deformable tab portions 17 so that the tab portions may be bent over the inner edges of the notches 16 to interlock the plates 11 and 12 in container-engaging position, as shown in Fig. 1.

When the containers 3 are so engaged, the upper flange or rim 15 will rest against the upper plate 11 as shown in Fig. 4, and in order to further maintain the containers in this position and to facilitate the handling of the device in the operations more particularly described hereinafter, a tab portion 18 may if desired be cut from the plate 11 at a position radially outwardly from the point b with respect to each of the openings 14, which tab portion may be bent back over the rim 15 as shown at the upper right hand side of Fig. 4, to engage the upper edge of such rim.

The food package according to this invention may be very conveniently employed on picnics and camping trips to carry a complete meal along with the necessary implements and accouterments necessary for the preparation of the meal. A package would ordinarily be sold in the condition shown in Figs. 1 and 2, with the cans or containers 3 containing the necessary components of the meal, eating utensils, and a suitable can opening device as indicated at 20 in Figs. 1 and 4.

Assuming that the user has received the package completely packed with the desired components of a meal together with the necessary utensils, and desires to prepare a meal, the lid or cover 2 is removed from the container 1; the contents of container 1, i. e., the supporting means 4 carrying the food containers 3, the serving tray 5, and other incidentals that may be present in the container 1, may then be removed. The several containers 3 are then preferably opened, through the agency of the can opener 20, hereinafter more particularly described, and such containers as contain meal components which are not to be heated may be removed from the supporting means. This may be done by disengaging the tabs 17, rotating the plates 11 and 12 to the unclamping positions shown in Fig. 3, removing the desired containers 3, and then returning the plates 11 and 12 to clamping position. Any convenient type of can opener may be employed, preferably one which will not remove the upper flange or rim 15 (which would interfere with the proper support of the several containers in the heating operation). A sufficient quantity of water may then be placed in the container 1 and the supporting means 4 (holding the remaining containers 3) may then be placed back into the container 1 so that the containers 3 are in contact with the body of water. Heat may be applied to the underside of the container 1 to heat the body of water and the contained food in the containers 3 for any desired length of time. After the food has become sufficiently heated the supporting means 4 and the containers 3 may be removed from the container 1 as a unit. The serving tray 5 may then be inverted over the supporting means 4 (into the dot-dash position shown in Fig. 2), so that the respective compartments or recesses 6 of the serving tray 5 overlie the upper rims 15 of the respective containers 3. The assembly may then be inverted so that the serving tray 5 is below each of the containers 3, preferably with a quick turning action, so that the food from each compartment 3 will fall into a separate compartment 6 in said tray. The contents of the unheated containers may then be placed in the remaining recesses or compartments 6, and the complete meal is ready for serving.

Any desired type of can opener may be used to open the containers 3; however, I prefer to use a can opener which is compact and inexpensive and which may be packed within the completed package. Referring particularly to Figs. 4 and 5, a convenient form of can opener 20 is shown as comprising a cutting blade 21 mounted on an elongated shank 22 adapted to extend through a central opening in the plates 11 and 12, as may be formed by providing a hollow rivet at 13 to provide an axis of pivotal movement for the can opener. The can opener is proportioned so that the blade 21 will engage the upper lid 3b of the container or can 3 adjacent and inwardly of the upper rim 15 so that the can may be opened by grasping the bottom thereof and twisting the same while pressing downwardly on the upper surface of the can opener 20.

For the purpose of preventing the can opener 20 from binding against the rim 15 as the can 3 is rotated (due to a tendency for the opener 20 to rotate about the center 13), and to assist in holding the blade portion 21 downwardly in cutting position, I preferably provide positioning means for said can opener, adapted to engage the supporting means 4. Such positioning means may advantageously comprise a depending lug or pin member 23 secured to the shank portion 22 of the opener 20, and extending downwardly through suitable aligned openings 24 and 24a in the respective plates 11 and 12. In view of the fact that a can 3 will ordinarily be rotated in a counter-clockwise direction (looking down upon the can as in Fig. 1), the pin 23 is advantageously curved downwardly and forwardly in the direction of movement of the portion of the can 3 which is adjacent the blade 21 as shown in Fig. 5, and the cutting edge of blade 21 is inclined upwardly and rearwardly as shown in Fig. 6.

Openings 25 and 25a, comparable to the openings 24 and 24a, may be formed in the plates 11 and 12, respectively, for the purpose of receiving the pin 23 and positioning the can opener 20 in an intermediate position during shipment of the package. In Fig. 1 the can opener 20 is shown in a position between two adjacent containers 3 with the pin 23 extending through the superimposed openings 25 and 25a. It will be understood that the tray 5 may also be provided with an opening aligned with the openings 25 and 25a to receive the pin 23 when in this latter position.

It will be appreciated that suitable means for heating the respective containers 3 may be enclosed in the completed package to obviate the use of external heat. For example, a package of quick-lime or some equivalent material adapted to generate heat when immersed in water, or a package of heating material such as "canned heat," may be included in the package. Such heating materials are indicated generally in dot-dash lines at 26 in Fig. 2.

The device may be discarded after use or certain portions thereof may be retained to be used again after replacing the used containers 3 with new sealed containers. It will also be appreciated that the container lid 2 may be used as a serving tray in place of the multi-compartment tray 6. The use of a lid 2 of the type shown as a serving tray will not maintain the desirable separation of the separate components of the meal; however, the lid 2 may be formed with a plurality of separate recesses or compartments, if desired, comparable in position and function to the recesses 6 in the tray 5, as will be apparent to one skilled in the art.

It will be noted that the internal containers, while closely engaged or clamped by the openings 14 in the supporting means, are rotatable within said openings by manual turning or rotation of the individual containers, and that the containers extend below the supporting means sufficiently to enable the user to grasp any individual container, below the supporting means, to exert the required turning movement in the above-described can opening operation. It will also be observed that the supporting means is positioned at a sufficient height above the bottom of the external container, relative to the height of the internal container, so as to support said internal containers in positions with their lower ends spaced from the bottom of the external container. By thus spacing the internal containers from the bottom of the external container, and supporting the internal containers adjacent their upper ends, the internal containers and their contents are prevented from being overheated or burned when the bottom wall of the outer container is heated as by placing over a flame, and the internal containers and their contents are heated only by transfer of heat thereto from the bottom wall through the water or other fluid medium within the external container and around the internal containers.

I claim:

1. A multiple food package comprising a pan-shaped external container provided with a removable lid member, supporting means disposed within said pan-shaped external container and removably supported therein in spaced relation to the bottom of said external container, and a plurality of separate hermetically sealed internal containers disposed within said external container and supportingly engaged by said supporting means, each of said separate internal containers containing a separate constituent of a meal and being of such construction as to itself maintain its contents hermetically sealed.

2. The construction set forth in claim 1, and comprising in addition, a can opener pivotally mounted on said supporting means and provided with a cutting blade, said internal containers being located at different positions about the pivotal axis of said can-opener, and said can-opener being movable about said axis to a plurality of different positions in which it engages said supporting means adjacent said axis and in each of which positions said cutting blade is brought into cutting engagement with a different one of said internal containers.

3. A multiple food package which comprises: a pan-shaped external container having an open upper end and provided with a removable lid member closing said open end; a tray member removably disposed within said external container and provided with a plurality of upwardly directed recesses; and a plurality of individually and independently hermetically sealed internal containers removably disposed within said pan-shaped external container and each containing a separate constituent of a meal, the respective internal containers being disposed within the respective recesses in said tray member.

4. The construction set forth in claim 3, and comprising in addition, supporting means removably disposed within said external container above said tray member and in supporting engagement with each of said internal containers.

5. A multiple food package which comprises: a pan-shaped external container having an open upper end and provided with a removable lid member closing said end; supporting means removably disposed within said external container and carrying a plurality of hermetically sealed internal containers, said supporting means comprising two relatively movable superimposed plate members provided with a plurality of co-operating openings equal in number to said internal containers, said plate members being relatively movable in one direction to a position such as to provide openings of a size sufficient to allow ready removal and insertion of said internal containers into said openings and relatively movable in the other direction to a position such as to define openings substantially equal to a smaller diameter of said internal containers so as to clamp said containers in position.

6. The construction set forth in claim 5, and comprising in addition, a can opener pivotally mounted on said supporting means and provided with a cutting blade, said internal containers being located at different positions about the pivotal axis of said can-opener, and said can-opener being movable about said axis to a plurality of different positions in which it engages said supporting means adjacent said axis and in each of which positions said cutting blade is brought into cutting engagement with a different one of said internal containers.

7. A multiple food package which comprises: a pan-shaped external container provided with a removable lid member; removable supporting means disposed within said external container, said supporting means comprising two superimposed plate members pivotally secured at their center portions and each provided with a plurality of openings uniformly angularly spaced about the point of pivotal connection of said plate members, the respective openings in said two plate members having a shape as defined by two overlapping eccentric circles of different diameter, and the respective openings in the two plates being relatively reversed and cooperating to define composite openings of one size upon relative movement of said plates in one direction into clamping position about the point of pivotal attachment and to define composite openings of larger diameter upon relative movement thereof into unclamping position in the other direction; and a plurality of hermetically sealed internal containers disposed within the respective openings in said supporting means, said internal containers having a smaller diameter substantially equal to the diameter of the composite openings of said one size and a larger diameter not greater than the diameter of said larger composite openings.

8. In a multiple food package, a supporting means carrying a plurality of hermetically sealed containers, said supporting means comprising two relatively movable superimposed plate members provided with a plurality of cooperating openings equal in number to said containers, said plate members being relatively movable in one direction to a position such as to provide openings of a size sufficient to allow ready removal and insertion of said containers into said openings and relatively movable in the other direction to a position such as to define openings substantially equal to a smaller diameter of said containers so as to clamp said containers in position.

9. In a multiple food package, a supporting means comprising two superimposed plate members pivotally secured at their center portions and each provided with a plurality of openings uniformly angularly spaced about the point of pivotal connection of said plate members, the respective openings in said two plate members having a shape as defined by two overlapping eccentric circles of different diameter, and the respective openings in the two plates being relatively reversed and cooperating to define composite openings of one size upon relative movement of said plates in one direction into clamping position about the point of pivotal attachment and to define composite openings of larger diameter upon relative movement thereof into unclamping position in the other direction; and a plurality of hermetically sealed containers disposed within the respective openings in said supporting means, said containers having a smaller diameter substantially equal to the diameter of the composite openings of said one size and a larger diameter not greater than the diameter of said larger composite openings.

10. A multiple food package comprising: a pan-shaped external container provided with a removable lid member; removable supporting means disposed within said pan-shaped external container; and a plurality of separate hermetically sealed internal containers disposed within said external container and each containing a separate constituent of a meal and being in itself of a hermetically sealed construction; said supporting means being provided with a plurality of openings conforming in shape to the external shape of said internal containers and fitting closely around said internal containers in clamping relation thereto to position the same, whereby said supporting means and said internal containers may be handled as a unit.

11. A multiple food package comprising: a pan-shaped external container provided with a removable lid member; a plurality of separate internal containers disposed within said external container and each containing a separate constituent of a meal and being in itself of a hermetically sealed construction; and removable supporting means disposed within said external container and supported thereby in spaced relation with respect to the bottom of said external container, said supporting means engaging said internal containers in clamping relation thereto and positioning the same with the lower ends thereof spaced from the bottom of said external container.

12. A multiple food package comprising: a pan-shaped external container provided with a removable lid member; removable supporting means disposed within said pan-shaped external container; a plurality of individually and independently hermetically sealed internal containers of circular cross-section disposed within said external container; said supporting means being provided with a plurality of openings and the respective internal containers being rotatably disposed within said openings and projecting below said supporting means, and a can-opener movably mounted on said supporting means, said can-opener being provided with a cutting blade and being mounted for movement to bring said cutting blade into a position of cutting engagement with respect to the upper end portion of any one of said plurality of internal containers.

13. The construction set forth in claim 12, and comprising in addition, cooperating positioning means provided on said supporting means and on said can-opener for resisting displacement of said can-opener from a position in which said cutting blade is in cutting engagement with respect to any one of said internal containers during rotation of said one container in a can-opening operation.

14. The construction set forth in claim 12, said can-opener being pivotally mounted on said supporting means, and said construction comprising in addition, cooperating positioning means provided on said supporting means and on said can-opener for preventing upward and rotative displacement of said can-opener from a position in which said cutting blade is in cutting engagement with respect to any one of said internal containers during rotation of said one container in a can-opening operation.

15. In a multiple food package, the combination which comprises: supporting plate means provided with portions defining a plurality of spaced circular openings; a plurality of individually and independently hermetically sealed containers of circular cross-section disposed in close-fitting rotatable engagement within the respective openings and projecting above and below said supporting plate means; a can-opening member provided with a cutting blade; and positioning means on said supporting plate means adapted to hold said can-opening member in any one of a plurality of different positions in which the cutting blade of said can-opening member engages the respective containers in cutting relation, said positioning means serving to resist relative displacement of said can-opening member when placed in any one of said positions, whereby the corresponding container may be opened by rotating the same in engagement with said cutting blade.

16. In a multiple food package, the combination as set forth in claim 15, in which each of said containers is provided with an annular projection disposed above the supporting plate means and of larger external diameter than the corresponding opening, and said can-opening member is so proportioned that the cutting blade thereof engages one of said containers at a position above said annular projection when said can-opening member is placed in any one of said positions.

WILLIAM H. HEISE.